United States Patent [19]

Chen et al.

[11] Patent Number: 5,034,977
[45] Date of Patent: Jul. 23, 1991

[54] PHASE ACCUMULATION DUAL TONE MULTIPLE FREQUENCY GENERATOR

[75] Inventors: Yarn-Chern Chen, Nan-Tou; Chern-Jsair Chung, Hsin-Chu, both of Taiwan

[73] Assignee: Industrial Technology Research Institute, Taipei, Taiwan

[21] Appl. No.: 333,105

[22] Filed: Apr. 4, 1989

[51] Int. Cl.$^5$ ............................................. H04M 1/00
[52] U.S. Cl. ..................................... 379/361; 379/418; 328/14; 328/128; 364/721
[58] Field of Search ...................... 379/360, 361, 418; 341/26; 370/110.2; 375/59; 340/825.48; 328/14; 364/721

[56] References Cited

U.S. PATENT DOCUMENTS

| | | | |
|---|---|---|---|
| 3,706,855 | 12/1972 | Pitroda et al. | 370/110.2 |
| 3,985,966 | 10/1976 | Edwards | 328/14 |
| 4,058,805 | 11/1977 | Lake | 379/360 |
| 4,390,754 | 6/1983 | Holberg | 341/26 |
| 4,639,554 | 1/1987 | Masuda et al. | 379/361 |

OTHER PUBLICATIONS

IBM Technical Disclosure, vol. 15, No. 11, 4/73, Adams et al.
Wireless Word, vol. 87, No. 1551, 12/81, pp. 40–43, Dawson.
International PCT Publication WO83/00588, 2/83.

Primary Examiner—Jin F. Ng
Assistant Examiner—Jhancy Augustus
Attorney, Agent, or Firm—Darby & Darby

[57] ABSTRACT

A method and apparatus for generating dual tone multiple frequency signals employing a low frequency quartz oscillator, wherein a phase accumulation dual tone multiple frequency generator is comprised of a low frequency quartz oscillator. Two phase selectors are connected to produce digital phase signals in response to a signal input. Two phase accumulators, each composed of an adder and a register, are connected to accumulate the phase signals. Two ROM based sine wave tables are addressed by the outputs of the accumulators. An adder adds the outputs of the ROMs, and a D/A converter produces an analog output from the output of the adder.

2 Claims, 5 Drawing Sheets

SINE-WAVE LOOK-UP TABLE

| \multicolumn{8}{c}{COLUMN} |
|---|---|---|---|---|---|---|---|
| n | $32(1+\sin\frac{(n+0.5)\Pi}{32})$ | BINARY | HEX | n | $32(1+\sin\frac{(n+0.5)\Pi}{32})$ | BINARY | HEX |
| 0 | 34 | 0100010 | 22 | 32 | 30 | 0011110 | 1E |
| 1 | 37 | 0100101 | 25 | 33 | 27 | 0011011 | 1B |
| 2 | 40 | 0101000 | 28 | 34 | 24 | 0011000 | 18 |
| 3 | 43 | 0101011 | 2B | 35 | 21 | 0010101 | 15 |
| 4 | 46 | 0101110 | 2E | 36 | 18 | 0010010 | 12 |
| 5 | 48 | 0110000 | 30 | 37 | 16 | 0010000 | 10 |
| 6 | 51 | 0110011 | 33 | 38 | 13 | 0001101 | 0D |
| 7 | 53 | 0110101 | 35 | 39 | 11 | 0001011 | 0B |
| 8 | 56 | 0111000 | 38 | 40 | 08 | 0001000 | 08 |
| 9 | 58 | 0111010 | 3A | 41 | 06 | 0000110 | 06 |
| 10 | 59 | 0111011 | 3B | 42 | 05 | 0000101 | 05 |
| 11 | 61 | 0111101 | 3D | 43 | 03 | 0000011 | 03 |
| 12 | 62 | 0111110 | 3E | 44 | 02 | 0000010 | 02 |
| 13 | 63 | 0111111 | 3F | 45 | 01 | 0000001 | 01 |
| 14 | 64 | 1000000 | 40 | 46 | 00 | 0000000 | 00 |
| 15 | 64 | 1000000 | 40 | 47 | 00 | 0000000 | 00 |
| 16 | 64 | 1000000 | 40 | 48 | 00 | 0000000 | 00 |
| 17 | 64 | 1000000 | 40 | 49 | 00 | 0000000 | 00 |
| 18 | 63 | 0111111 | 3F | 50 | 01 | 0000001 | 01 |
| 19 | 62 | 0111110 | 3E | 51 | 02 | 0000010 | 02 |
| 20 | 61 | 0111101 | 3D | 52 | 03 | 0000011 | 03 |
| 21 | 59 | 0111011 | 3B | 53 | 05 | 0000101 | 05 |
| 22 | 58 | 0111010 | 3A | 54 | 06 | 0000110 | 06 |
| 23 | 56 | 0111000 | 38 | 55 | 08 | 0001000 | 08 |
| 24 | 53 | 0110101 | 35 | 56 | 11 | 0001011 | 0B |
| 25 | 51 | 0110011 | 33 | 57 | 13 | 0001101 | 0D |
| 26 | 48 | 0110000 | 30 | 58 | 16 | 0010000 | 10 |
| 27 | 46 | 0101110 | 2E | 59 | 18 | 0010010 | 12 |
| 28 | 43 | 0101011 | 2B | 60 | 21 | 0010101 | 15 |
| 29 | 40 | 0101000 | 28 | 61 | 24 | 0011000 | 18 |
| 30 | 37 | 0100101 | 25 | 62 | 27 | 0011011 | 1B |
| 31 | 34 | 0100010 | 22 | 63 | 30 | 0011110 | 1E |

Fig.4.

SINE-WAVE LOOK-UP TABLE

| n | $32(1+\sin\frac{(n+0.5)\Pi}{32})$ | BINARY | HEX | n | $32(1+\sin\frac{(n+0.5)\Pi}{32})$ | BINARY | HEX |
|---|---|---|---|---|---|---|---|
| 0 | 33 | 100001 | 21 | 32 | 31 | 011111 | 1F |
| 1 | 36 | 100100 | 24 | 33 | 28 | 011100 | 1C |
| 2 | 38 | 100110 | 26 | 34 | 26 | 011010 | 1A |
| 3 | 41 | 101001 | 29 | 35 | 23 | 010111 | 17 |
| 4 | 43 | 101011 | 2B | 36 | 21 | 010101 | 15 |
| 5 | 45 | 101101 | 2D | 37 | 19 | 010011 | 13 |
| 6 | 47 | 101111 | 2F | 38 | 17 | 010001 | 11 |
| 7 | 49 | 110001 | 31 | 39 | 15 | 001111 | 0F |
| 8 | 51 | 110011 | 33 | 40 | 13 | 001101 | 0D |
| 9 | 52 | 110100 | 34 | 41 | 12 | 001100 | 0C |
| 10 | 54 | 110110 | 36 | 42 | 10 | 001010 | 0A |
| 11 | 55 | 110111 | 37 | 43 | 09 | 001001 | 09 |
| 12 | 56 | 111000 | 38 | 44 | 08 | 001000 | 08 |
| 13 | 57 | 111001 | 39 | 45 | 07 | 000111 | 07 |
| 14 | 57 | 111001 | 39 | 46 | 07 | 000111 | 07 |
| 15 | 57 | 111001 | 39 | 47 | 07 | 000111 | 07 |
| 16 | 57 | 111001 | 39 | 48 | 07 | 000111 | 07 |
| 17 | 57 | 111001 | 39 | 49 | 07 | 000111 | 07 |
| 18 | 57 | 111001 | 39 | 50 | 07 | 000111 | 07 |
| 19 | 56 | 111000 | 38 | 51 | 08 | 001000 | 08 |
| 20 | 55 | 110111 | 37 | 52 | 09 | 001001 | 09 |
| 21 | 54 | 110110 | 36 | 53 | 10 | 001010 | 0A |
| 22 | 52 | 110100 | 34 | 54 | 12 | 001100 | 0C |
| 23 | 51 | 110011 | 33 | 55 | 13 | 001101 | 0D |
| 24 | 49 | 110001 | 31 | 56 | 15 | 001111 | 0F |
| 25 | 47 | 101111 | 2F | 57 | 17 | 010001 | 11 |
| 26 | 45 | 101101 | 2D | 58 | 19 | 010011 | 13 |
| 27 | 43 | 101011 | 2B | 59 | 21 | 010101 | 15 |
| 28 | 41 | 101001 | 29 | 60 | 23 | 010111 | 17 |
| 29 | 38 | 100110 | 26 | 61 | 26 | 011010 | 1A |
| 30 | 36 | 100100 | 24 | 62 | 28 | 011100 | 1C |
| 31 | 33 | 100001 | 21 | 63 | 31 | 011111 | 1F |

Fig. 5.

| STANDARD | MEASURED VALUE | MEASURED ERROR | CALCULATION ERROR |
| --- | --- | --- | --- |
| < Hz > | < Hz > | < % > | < % > |
| 1633 | 1632.6 | -0.02 | -0.06 |
| 1477 | 1480.6 | +0.24 | +0.2 |
| 1336 | 1336.6 | +0.04 | 0 |
| 1209 | 1208.6 | -0.03 | -0.08 |
| 941 | 940.2 | -0.09 | -0.11 |
| 852 | 852.4 | +0.05 | 0 |
| 770 | 768.4 | -0.21 | -0.26 |
| 697 | 696.4 | -0.08 | -0.14 | ns
PHASE ACCUMULATION DUAL TONE MULTIPLE FREQUENCY GENERATOR

This invention relates to a method and apparatus for the generation of DTMF signals.

BACKGROUND OF THE INVENTION

Conventional DTMF generators employ analog circuit techniques. For instance, known tone dialer CIC 9145 employs analog circuits. With this construction, low frequency quartz crystals cannot be employed to generate the system clock for accurate DTMF signals. Since the frequency that composes the DTMF signal must be divided into thirty-two parts every cycle, the lowest frequency of the system clock in the tone dialer must be higher than a few hundred kilohertz for an accurate DTMF signal. This results in an increase of the operating current, and also increases the cost of the device. In addition, analog integrated circuits are difficult to test, and the parameters of analog IC's are sensitive to the testing process.

FIG. 3 is a block diagram of a conventional tone dialer. The DTMF generator portion consists of three blocks: a data latch and encoder 100, a row and column programmable counter 200, and a D/A converter 300. With this architecture, it is impossible to use a low frequency quartz crystal (e.g. 32768 Hz) to generate a DTMF signal with high accuracy, and it is also difficult to change the output frequency. If it is necessary to change the output frequency of a conventional DTMF generator, it is necessary to employ different hardware.

SUMMARY OF THE INVENTION

It is therefore the object of the invention to provide a digital IC that is much easier to manufacture and test than an analog IC, and that provides a fully digitalized DTMF generator instead of an analog generator.

The present invention is directed to the provision of a generator wherein it is only necessary to change the code in the phase selector in order to change the output frequency, so that any frequency below the quartz oscillator frequency can be generated. In application, the system of the invention replaces the DTMF generator portion in FIG. 3, and the output frequency is changeable without changing the hardware. Since the system of the invention can employ low frequency quartz oscillators; such as a 32,768 Hz quartz crystal oscillator, the invention is applicable for use with any kind of telecommunication integrated circuit.

High frequency quartz oscillators are more expensive than low frequency quartz oscillators. The invention enables the use of low frequency quartz oscillators not only to decrease the cost of the system, but also for the convenience of their use. The invention is applicable to any integrated circuit telecommunication system if its system clock is larger than or equal to the system clock frequency (e.g. 32,768 Hz) of the present invention.

In addition, the invention provides a more readily and economically fabricated DTMF generator. Thus, the invention employs a phase accumulation method using two ROM based sine wave look-up tables. The output frequency is adjustable by modifying the code in the phase selector ROM. In accordance with IC circuit process techniques, modification of the code only requires changing the circuit connections of one level of photo mask.

BRIEF DESCRIPTION OF THE DRAWING

In order that the invention may be more clearly understood, it will now be disclosed in greater detail with reference to the accompanying drawing, wherein:

FIG. 4 is a column sine-wave look-up table;

FIG. 5 is a row sine-wave look-up table; and

DETAILED DISCLOSURE OF THE INVENTION

Figure 1:
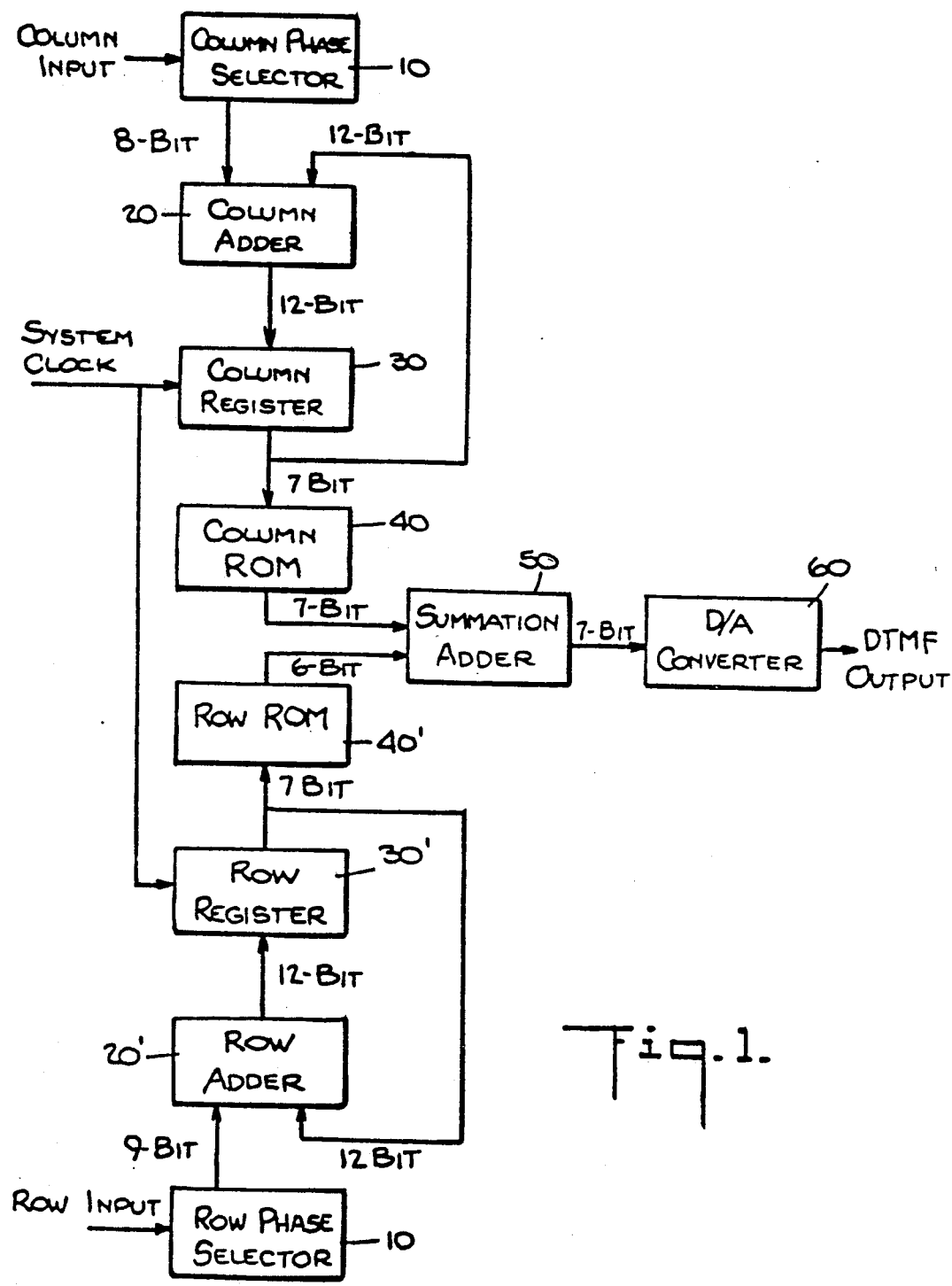
FIG. 1 is a block diagram of a system in accordance with the present invention.

Referring now to FIG. 1, therein is illustrated a block diagram of the present invention, wherein input from the keyboard (for example, the dialer of a telephone set), is directed to the column and row phase selectors 10, 10'. The signals corresponding to the selected column and row are converted to selected phase codes in the circuit 10 and 10'. In response to the system clock the phase values are accumulated in the column and row adders 20, 20' and the accumulated values are applied to the column and row registers 30, 30'. The outputs of registers 30, 30' are applied to the read only memory ROMs 40, 40' as addresses. These ROMs are sine-wave look-up tables. The outputs of the registers 30, 30' are also applied to the column and row adders 20, 20' as accumulation values for the next sampling time. The outputs of ROMs 40 40' are column and row sine-wave data, and are added in adder 50. The output of the adder 50 is converted to analog form in a D/A converter 60, to output a dual tone multiple frequency signal.

The invention is implemented by a method that employs phase accumulation. To change the output frequency, this invention does not require changing the structure of the hardware, but instead merely requires changing the code of the phase selectors 10, 10'. The invention can thus generate any frequency by proper adjustment of the code in the phase selectors. Column and row sine wave look-up tables are stored in ROMs 40, 40'.

DTMF specifications set a predetermined emphasis. That is, the amplitude of the column voltage is set to be 2 db larger than the row voltage. The preemphasis specification is defined as $20*\log (V_{col}/V_{row})$, where $V_{col}$ is the column amplitude and $V_{row}$ is the row amplitude. In conventional generators, this specification is implemented by the ratio of two registers. In accordance with the present invention, however, this specification is implemented merely by encoding the codes of the ROMs 40, 40'.

Figure 2:
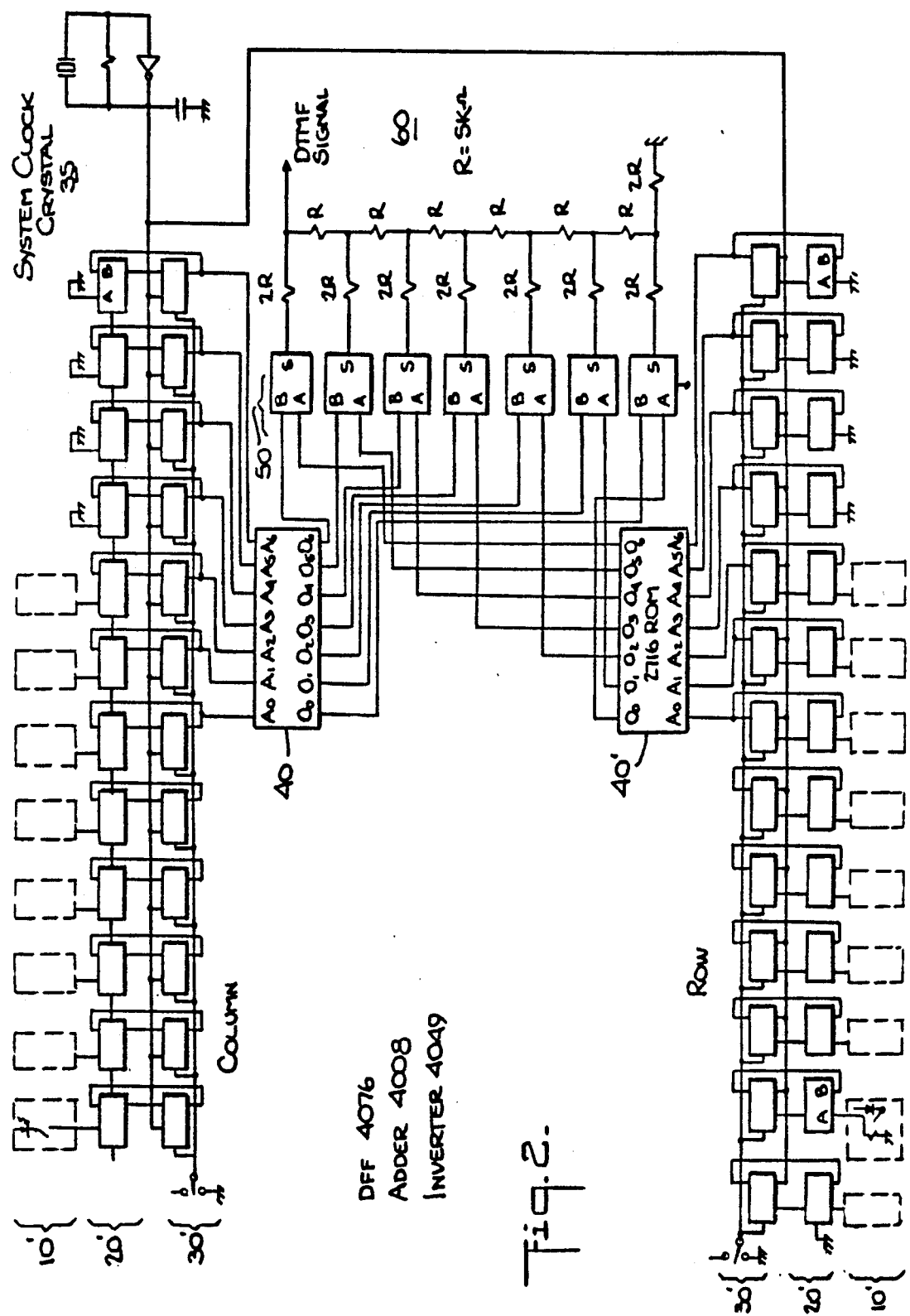
FIG. 2 is a block diagram of the preferred embodiment of the present invention.

The preferred embodiment of the invention is illustrated in FIG. 2, wherein 10, 10' are the column and row phase selectors. The selectors contain codes representing four different column frequencies and four different row frequencies. The signals input to the selectors select the proper code for the respective frequencies, and these codes are applied to the adders 20, 20'. The phase codes generated by the column and row selectors are calculated according to the following equation:

$$\delta\Theta = (f_1/f)*32... \quad \text{(eq. 1.1)}$$

where : $\delta\Theta$ is the phase code output by the selectors, $f_1$ is the frequency that is desired to be generated, and f is the system clock frequency. Since the system clock frequency is known it is only necessary to insert a signal corresponding to the desired column or row output frequency into equation 1.1 in order to derive the respective phase code. The selectors 10, 10' may hence comprise any conventional devices for providing an output in accordance with equation 1.1. The column phase code is preferrably 8 bits long and the row phase code is preferrably 9 bits long. The number of bits that are needed for encoding the phase code depends upon the required precision, and hence can be varied from the above values.

The main functions of the adders 20, 20', which may be type 4008 IC's, is to add the phase code values from the phase selectors to the accumulation values from the registers 30, 30' upon the occurence of each system clock 35 pulse, and to apply the result to the registers 30, 30'. The adders and registers are preferrably 12 bits long.

Figures 3, 6:
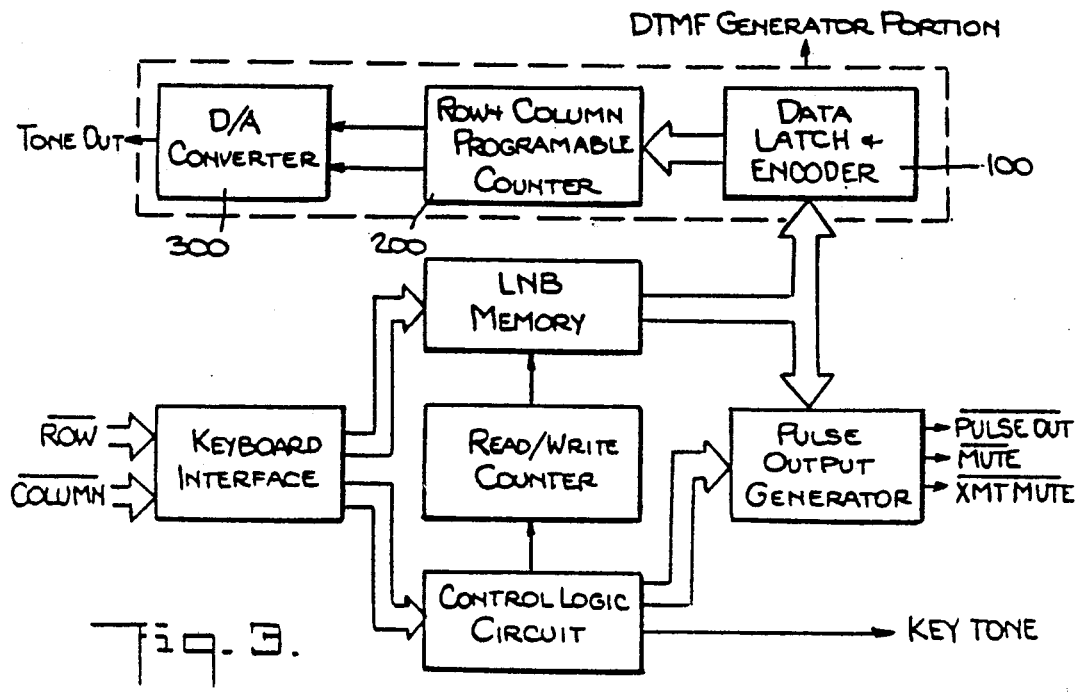
FIG. 3 is a block diagram of a conventional tone dialer.
FIG. 6 is a table illustrating the measurement value comparison by calculation value and the error percentage.

The registers 30, 30', which may be formed of D type flip flops 4076, latch the accumulation value from the adders 20, 20' during each system clock cycle and send the most significant 7 bits to ROMs 40, 40' as addresses. In response to these address signals, the sine wave values stored in the ROMs 40, 40', in accordance with FIGS. 4 and 5, are read out and applied to the adders 50. The output of ROM 40 is the value of the column sine wave which is represented by 7 bit sequential data, and the output of ROM 40' is the value of the row sine wave which is represented by 6 bit sequential data. Adder 50 adds the column sine wave value and the row sine wave value to obtain 7 bit data and applies the result to the D/A converter 60. This converter may be comprised of a simple R-2R network. This circuit converts the digital output signal of the adder 50 to an analog signal output. The measured value is listed in FIG. 6. The first column of FIG. 6 shows the standard DTMF frequencies. The second column lists the corresponding measured values of the present invention, employing the circuit of FIG. 2. Column 3 is the measured error defined as:

$$\left[ \frac{\text{measured value}}{\text{standard freq.}} - 1 \right] * 100\%$$

Column 4 is the calculation error defined as:

$$\left[ \frac{\text{phase code}}{\text{phase value } (\delta\Theta)} - 1 \right] * 100\%$$

The phase value $\delta\Theta$ is defined by equation 1.1. The phase code is a binary coding of the phase value. Increases in the number of bits results in increased accuracy.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A DTMF generator, comprising:
    column phase selecting means for selecting a column phase which corresponds to one of the desired frequencies of a DTMF signal;
    row phase selecting means for selecting a row phase which corresponds to one of the desired frequencies of the DTMF signal;
    a column register for latching a column phase accumulation value for one clock period;
    a row register for latching a row phase accumulation value for one clock period;
    column adding means for adding the outputs of said column phase selecting means and said column register and for applying the output thereof to said column register;
    row adding means for adding the outputs of said row phase selecting means and said row register and for applying the outputs thereof to said row register;
    column ROM look-up means for receiving the output of said column register as an address signal, and for producing a sequential digital code corresponding to a desired column frequency;
    row ROM look-up means for receiving the output of said row register as an address signal, and for producing an output signal corresponding to a desired row frequency;
    said column and row ROM look-up means having different preemphasis;
    summing means for receiving the outputs of said column ROM look-up means and said row ROM look-up means, and for producing a sequential digital code corresponding to a DTMF signal; and
    a digital-to-analog converter for receiving the output of said summing means and for producing a stepped sine wave output.

2. A method for generating a DTMF signal comprising:
    selecting first and second binary codes representing phases which correspond to first and second desired frequencies for the DTMF signal;
    separately accumulating and latching the phase codes once during each clock period to obtain first and second phase accumulation values;
    addressing separate first and second ROM look-up tables that have different preemphasis using the most significant portions of said first and second phase accumulation values respectively to produce first and second sequential digital codes which correspond to the first and second desired frequencies of the DTMF signal; and
    summing said first and second sequential codes for producing a third sequential digital code which corresponds to the desired DTMF signal.

* * * * *